UNITED STATES PATENT OFFICE.

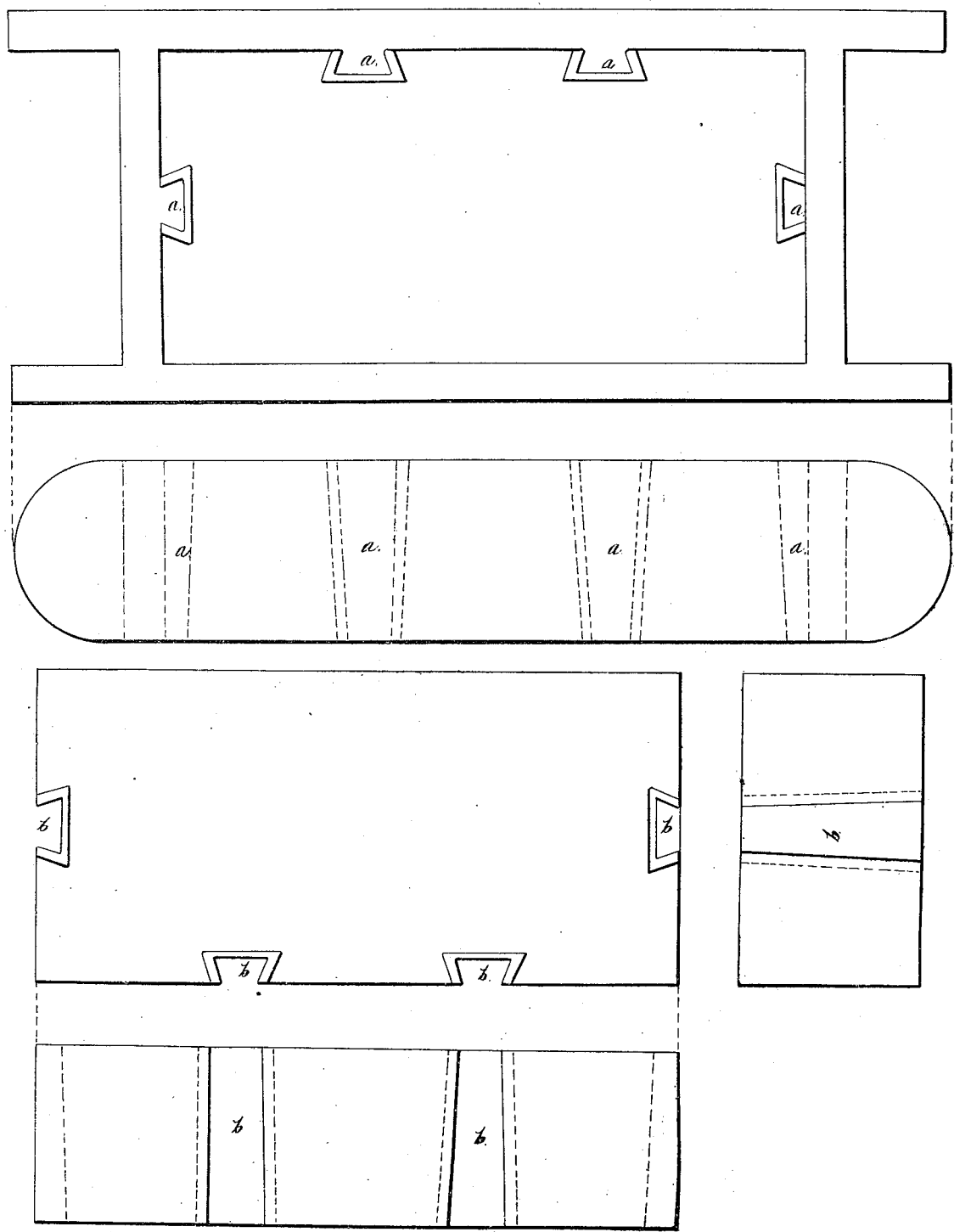

NATHAN TOWSON, OF WASHINGTON, DISTRICT OF COLUMBIA.

BRICK.

Specification of Letters Patent No. 5,570, dated May 16, 1848.

*To all whom it may concern:*

Be it known that I, NATHAN TOWSON, of the city of Washington, in the District of Columbia, have invented a new and improved brick for strengthening walls and other brickwork and for fastening and retaining mortar or other plastic material used in stuccoing, rough-casting, or plastering brickwork; and the following is an exact description of the same.

My invention consists in molding brick with dove-tail grooves or indentations that will retain and secure by means of the dove-tails, mortar or any plastic material used for cementing brick or for plastering stuccoing or rough-casting brickwork.

To enable others to use my invention I give the following description of the method I use in making such brick.

Take a mold similar to those used in making common brick and affix male dove-tails to the sides of the mold which are to form the surface of the brick intended to be cemented or plastered. See drawing of mold herewith; letters a, a, a, a. These dove-tails are intended to impress on the clay when molded female dove-tails corresponding therewith. See drawings of brick, letters b, b, b, b. These dove-tails are slightly wedge shaped to facilitate turning the molded clay out, and extend transversely across the sides of the mold. After molding, the brick will be dried and burnt in the usual way. In molding, the broadest part of the dove-tail will be down and be reversed in turning out. In laying the brick in walls, the widest part of the dove-tail should be at the top in order that the mortar may fill it more effectually in settling. It is evident that brick having such dove-tails will be held together more firmly by mortar forced into them, when it becomes hard and forms male dove-tails, than when the mortar is only held by its adhesion to plain surfaces, and that walls to be plastered or stuccoed, when formed with such brick, will present surfaces covered with dove-tail grooves that will hold the plastic material forced into them, firm and immovable and render the stuccoing as permanent as the wall itself.

What I claim as my invention, and desire to secure by Letters Patent, is—

The forming brick with dove-tail groove, or other dove-tail indentations by means of which the brick when covered with mortar will be held together and by which mortar, plaster or other material used in plastering stuccoing or rough casting brickwork will be securely fastened thereto and prevented cracking and falling or peeling off.

N. TOWSON.

Witnesses:
 GEO. H. RINGGOLD,
 WM. D. BEALL.